United States Patent
Mimura et al.

[19]

[11] Patent Number: 6,117,404
[45] Date of Patent: Sep. 12, 2000

[54] APPARATUS AND PROCESS FOR RECOVERING BASIC AMINE COMPOUNDS IN A PROCESS FOR REMOVING CARBON DIOXIDE

[75] Inventors: Tomio Mimura; Hidenobu Shimayoshi, both of Osaka; Shigeaki Mitsuoka; Hiroshi Tanaka, both of Hiroshima; Masaki Iijima, Tokyo, all of Japan

[73] Assignees: The Kansai Electric Power, Co., Inc., Osaka; Mitsubishi Heavy Industries, Ltd., Tokyo, both of Japan

[21] Appl. No.: 08/818,625

[22] Filed: Mar. 14, 1997

[30] Foreign Application Priority Data

Mar. 29, 1996 [JP] Japan .................................. 8-076495

[51] Int. Cl.[7] .............................. B01D 53/18; B01D 53/62
[52] U.S. Cl. ............................. 423/228; 423/229; 96/363; 96/364
[58] Field of Search ..................................... 423/226, 228, 423/229; 55/233, 257.1, 257.6; 96/363, 364

[56] References Cited

U.S. PATENT DOCUMENTS

| | | | |
|---|---|---|---|
| 2,592,762 | 4/1952 | Taylor et al. | 423/229 |
| 2,608,461 | 8/1952 | Frazier | 423/229 |
| 3,989,811 | 11/1976 | Hill | 423/229 |
| 4,313,917 | 2/1982 | Ohta | 423/228 |
| 4,477,419 | 10/1984 | Pearce et al. | 423/229 |
| 4,624,839 | 11/1986 | Wolcott | 423/228 |
| 4,744,806 | 5/1988 | Ozolins et al. | 95/273 |
| 5,209,914 | 5/1993 | Peytavy | 423/228 |
| 5,318,758 | 6/1994 | Fujii | 423/228 |
| 5,364,604 | 11/1994 | Spink et al. | 423/210 |

FOREIGN PATENT DOCUMENTS

| | | |
|---|---|---|
| 0 671 199 | 9/1995 | European Pat. Off. . |
| 92/12786 | 8/1992 | WIPO . |

OTHER PUBLICATIONS

Database WPI, "Simultaneous Treat Desulpurise Decarbonise Absorb Sulphur Oxide Carbon DI Oxide Gas Treat Amine System Compound Carbon DI Oxide", JP 06 086 911, (Mar. 29, 1994).

Primary Examiner—Steven P. Griffin
Assistant Examiner—Peter DiMauro
Attorney, Agent, or Firm—Foley & Lardner

[57] ABSTRACT

The present invention provides a process for recovering a basic amine compound which comprises the steps of (a) supplying a $CO_2$-containing gas to a carbon dioxide absorption unit in which an absorbing solution, which contains a basic amine compound, absorbs carbon dioxide; (b) bringing the gas, from which carbon dioxide has been removed, into vapor-liquid contact with a washing water at a temperature from 20 to 60° C. in an amine recovering unit of a carbon dioxide removal tower, recovering part of the basic amine compound accompanying the gas into the water phase and discharging the gas as an exhaust gas of the carbon dioxide removal tower; and (c) collecting the basic amine compound which remains in the exhaust gas of the carbon dioxide removal tower by passing the exhaust gas pass through a demister at a temperature from 20 to 60° C. The basic amine compound can be recovered efficiently from the gas of the carbon dioxide removal tower by using the above process.

15 Claims, 1 Drawing Sheet

F I G. 1
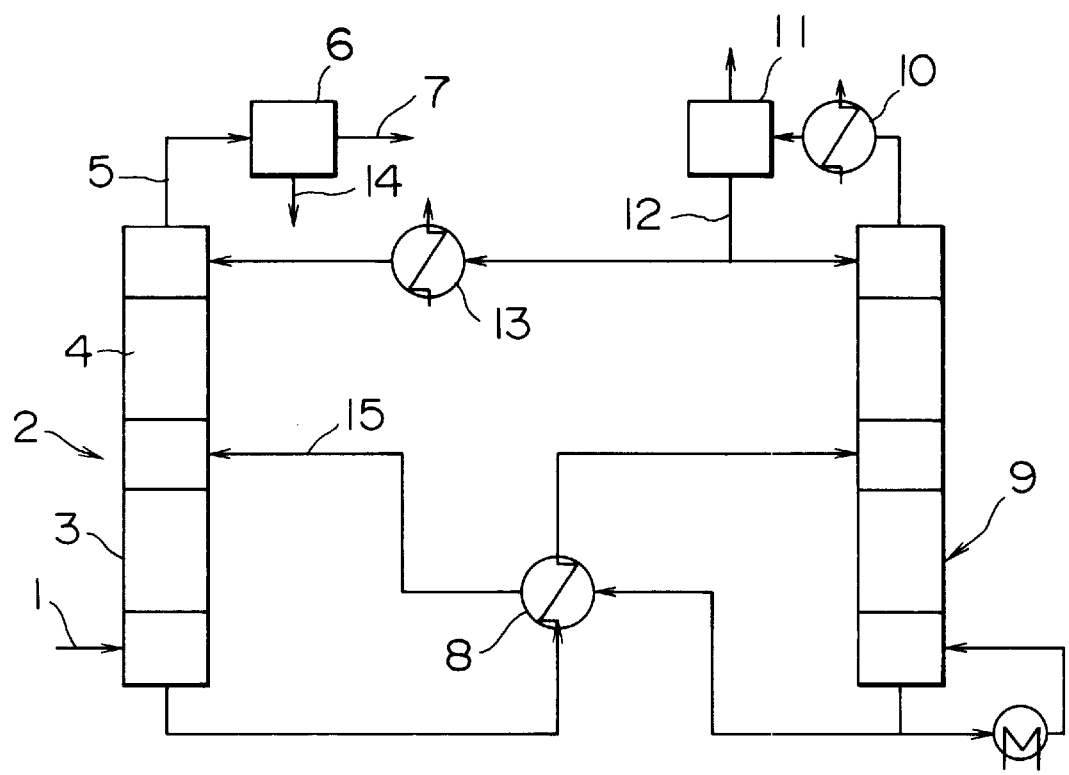

ium and then passing the gas through a demister at a temperature within a specific range. Based on the above findings, the present invention has been accomplished.

APPARATUS AND PROCESS FOR RECOVERING BASIC AMINE COMPOUNDS IN A PROCESS FOR REMOVING CARBON DIOXIDE

FIELD OF THE INVENTION AND RELATED ART STATEMENT

The present invention relates to a process for recovering basic amine compounds which are used in a process for removing carbon dioxide wherein carbon dioxide which is contained in a gas is absorbed and removed.

In recent years, large amounts of coal, heavy oils and super heavy oils have been used as fuel in thermal power system, boiler facilities and the like. Exhaust of sulfur oxide such as sulfur dioxide, nitrogen oxide, carbon dioxide and the like, are now in question and from the viewpoint of air pollution prevention and overall environmental improvement, should be reduced in quantity or in density. Regarding carbon dioxide exhaust, problems occur when LNG (liquefied natural gas) or the like is used as fuel.

Recently, in order to prevent global warming, the reduction of discharged carbon dioxide as well as the reduction of discharged flon, methane gas and the like has been studied.

For this purpose, various processes have been studied such as a PSA (Pressure Swing Application) process; a membrane separation condensation process; a process for fixing carbon dioxide by reacting it with a basic compound; a process for fixing carbon dioxide by utilizing the assimilation of plants; a process for liquefying or solidifying carbon dioxide after its separation and purification; and a process for converting carbon dioxide into fuel by hydrogenation.

Among these processes, the process of fixing carbon dioxide with amine is highly useful. For example, Japanese Provisional Patent Publication No.6-86911 discloses a process for desulfurization and carbon dioxide removal concurrently by using an amine aqueous solution.

In this process, the reaction of amine with carbon dioxide is an exothermic reaction, thus the temperature of the solution after absorbing carbon dioxide increases and the vapor pressure of amine increases greatly. Consequently, the amount of the amine which is contained in the resultant gas increases. Accordingly, an amine collection unit is installed and the resultant gas is brought into contact with water in such a unit so that part of the amine which is contained in the resultant gas is collected into the water.

However, the above process has a high operating costs and is likely to produce a significant air pollution, since the temperature of water in contact with the gas in the amine collecting portion is high, and an amine which is contained in an exhaust gas is discharged to the atmosphere.

The objects of the present invention in view of the above-described prior art are to provide a process and an apparatus which are capable of collecting basic amines effectively from an exhaust gas which has been discharged from an apparatus for removing carbon dioxide in which a $CO_2$-containing gas comes into contact with a solution having a basic amine compound.

SUMMARY OF THE INVENTION

The present inventors performed extensive studies to attain the above objects and found that amine can be recovered effectively by bringing the gas remaining after the absorption of carbon dioxide into contact with water at a temperature within a specific range within an amine recovering unit and then passing the gas through a demister at a temperature within a specific range. Based on the above findings, the present invention has been accomplished.

The present invention provides a process for recovering basic amine compounds, comprising the steps of:

supplying a $CO_2$-containing gas to a carbon dioxide absorption unit and absorbing carbon dioxide into a carbon dioxide absorbing liquid which contains basic amine compounds;

bringing the resultant gas into contact with washing water in the amine recovering unit at a temperature from 20 to 60° C. and preferably from 20 to 50° C. to recover part of the basic amine compounds, which are contained in the resultant gas, into the washing water and discharging the remaining gas from a carbon dioxide removal tower; and passing the exhaust gas which has discharged from the carbon dioxide removal tower through a demister at a temperature from 20 to 60° C. to collect the basic amine compounds which are contained in the exhaust gas.

The present invention also provides an apparatus for absorbing carbon dioxide which comprises:

a carbon dioxide removal tower which has a carbon dioxide absorption unit in the lower portion and an amine recovering unit in the upper portion, the carbon dioxide absorption unit being supplied with a $CO_2$-containing gas from the outside and an absorbing liquid containing basic amine compounds, and the amine recovering unit being capable of bringing a gas which has passed through the carbon dioxide absorption portion into vapor-liquid contact with washing water at a temperature from 20 to 60° C.; and a demister which is located on the downstream of exhaust gas from the carbon dioxide removal tower and through which the exhaust gas from the carbon dioxide removal tower can pass at a temperature from 20 to 60° C.

According to the present invention, it is possible to decrease drastically the density of the amine compounds which are contained in the exhaust gas discharged from the carbon dioxide removal tower to the atmosphere. Consequently, the operating costs and resultant air pollution can be reduced.

BRIEF DESCRIPTION OF THE DRAWINGS

FIG. 1 is a schematic diagram showing a process for absorbing carbon dioxide to which the process of the present invention is directed.

DETAILED DESCRIPTION OF PREFERRED EMBODIMENTS

The $CO_2$-containing gases to be treated in the present invention are not limited to specific gases and may be fuel gas or exhaust gas resulting from burning fuel. The present invention is applicable to a process for treating any $CO_2$-containing gas. The gases to be treated may contain moisture, sulfur oxides, nitrogen oxides, oxygen gas and other acidic gases. Further, the gases to be treated may be in a pressurized state or in a depressurized state and may have high or low temperature. Preferably, an exhaust gas resulting from the burning of fuel at about atmospheric pressure is used.

Basic amines which ate used in the present invention (sometimes abbreviated as "amines" in this specification) includes hydroxylamines such as monoethanolamine, diethanolamine and butylethanolamine; tertiary amines such as dimethylaminoethanol and methylpyrrolidone; hindered amines such as 2-amino-2-methyl-1-propanol; amino acids such as methylaminocarboxylic acid; and mixture thereof. These basic amines are usually used in the form of an aqueous solution. If necessary, methanol, polyethylene glycol, sulfolane and the like may be added to the basic amine compounds.

In the process for recovering basic amine compounds of the present invention, said apparatus for absorbing carbon dioxide can be used.

A carbon dioxide absorption unit and an amine recovering unit in a carbon dioxide removal tower, respectively, may be in the form of a packed tower or a plate tower. The amine aqueous solution which has been recovered in the amine recovering unit is added together with the carbon dioxide absorbing liquid containing the amines, to the top of the carbon dioxide absorption unit. The amine in the carbon dioxide absorbing liquid reacts with carbon dioxide to form a carbonate complex of the amine. This complex is decomposed by heating, which discharges carbon dioxide, and thus the amine is regenerated in the regeneration tower. The regenerated carbon dioxide absorbing liquid can be recycled in a process for removing carbon dioxide. Carbon dioxide which has discharged from the upper portion of the regeneration tower contains moisture and is separated into carbon dioxide and water by cooling in a condenser. The resultant water is used as washing water within the amine recovering unit of the carbon dioxide removal tower.

On the other hand, the carbon dioxide absorbing liquid absorbs carbon dioxide to produce heat during the process for removing carbon dioxide as described above. Accordingly, when the gas temperature is about 60° C. at the inlet of the carbon dioxide absorption unit, the gas temperature at the outlet increases to about 80° C. Consequently, vapor pressure of the amine in the carbon dioxide absorbing liquid becomes high and the amount of the amine which is contained in the resultant gas increases. In the present invention, the resultant gas is brought into contact with washing water at a specific temperature range in the amine recovering unit to recover part of the amine into the water phase. Further, the residual gas is passed through a demister, which is located on the downstream side of the amine recovering unit, at a specific temperature range for collecting the amine contained in the residual gas.

When water which is brought into contact with the gas in the amine recovering unit has a temperature of above 60° C., the amine cannot be collected sufficiently by the demister and an exhaust gas containing 70 ppm or more of the amine is discharged outside. When the temperature of the washing water is lowered to regulate the vapor-liquid contact temperature of the upper amine recovering unit in the range from 20 to 60° C., and preferably from 20 to 50° C., the volume of the amine which is contained in the gas from the demister decreases remarkably to below 20 ppm. In general, the temperature of the washing water, the temperature of the vapor-liquid contact and the temperature of the gas are almost the same.

By comparing the amount of the amine which is contained in the gas at the outlet of the amine recovering unit with the amount of the amine which is discharged outside from the outlet of the demister, it is easily understood that the decrease of amine is not only due to the decrease of vapor pressure of the dilute amine aqueous solution but also due to additional reasons. For example, as shown in the Examples which are described below, when the vapor-liquid contact temperature is 65° C. and the gas at the outlet of the amine recovering unit contains 300 ppm of amine, the amine collection ratio in the demister is about 77%. In contrast, when the vapor-liquid contact temperature is 45° C. and the gas at the outlet of the amine collection unit contains 100 ppm of amine, the amine collection ratio in the demister is about 90%. This data shows that the amine collection ratio at the demister is remarkably high in the present invention.

It is supposed that because the particle diameter of mist becomes moderately large within a range of not scattering again or the viscosity of mist becomes high by increasing the vapor-liquid temperature in the amine recovering unit up to 20 to 60° C., the amine collection efficiency is improved as a whole. It is not necessary that the treating temperature of a gas in the demister is exactly the same as the vapor-liquid contact temperature in the amine recovering unit. However, it is required that both of the temperatures are in the range from 20 to 60° C. If the cooling temperature is below 20° C., operational inefficiency will occur.

The demister (sometimes referred to as a "mist separator") may be of conventional form, such as two-stepwise inclined plate form, wave form, teardrop form or wire mesh form, preferably in a wire mesh form and more preferably in the wire form composed of fine fibrous layers. The demister may have a structure capable of being cooled.

The collected mist which is accumulated in the bottom of the demister is supplied to the carbon dioxide removal tower or the regeneration tower directly or after being dissolved in a solvent such as water, and can be reused. Consequently, the volumn of the amine which is discharged to the outside can be reduced from 1/30 to 1/5 compared to the conventional art.

The present invention is further explained with reference to the accompanying drawings. FIG. 1 is a schematic diagram showing a process for absorbing carbon dioxide according to the invention.

An exhaust gas 1 resulting from burning fuel and containing carbon dioxide is supplied to a carbon dioxide absorption unit 3 installed in the lower part of a carbon dioxide removal tower 2. An amine absorbing liquid is supplied from the top of the carbon dioxide absorption unit 3. The exhaust gas and the amine absorbing liquid are brought into contacted with to each other and the amine absorbing liquid absorbs carbon dioxide contained in the exhaust gas. The residual gas moves upwardly in an amine recovering unit 4, and is brought into vapor-liquid contact with water which is supplied from the top of the amine recovering unit at a temperature from 20 to 60° C., preferably 20 to 50° C. Thus, the accompanying amine is recovered by the water phase. An exhaust gas 5 discharged from the carbon dioxide removal tower 2 is introduced into a demister 6 located on the downstream side of the carbon dioxide removal tower 2, is passed through the demister 6 at a temperature within the range, collects the amine in the form of a mist and is discharged to the atmosphere as a residual gas 7. Collected amine is released as collected amine 14 and is supplied to the carbon dioxide removal tower 2 or the regeneration tower 9 directly or after being dissolved in a solvent such as water, and is reused.

On the other hand, the amine absorbing solution, which has absorbed carbon dioxide, is heated by the regenerated absorbing solution 15 at a heat exchanger 8, and is supplied to the regeneration tower 9, and is heated at a temperature from 80 to 150° C. to release carbon dioxide and is regenerated. The regenerated amine absorbing solution 15 is cooled by the heat exchanger 8 and is recycled to the top of the carbon dioxide absorption unit 3.

Carbon dioxide which is discharged from the top of the regeneration tower 9 and which is saturated with water is cooled with a condenser 10 and the water contained therein is discharged by a separator 11. Part of the separated water 12 is refluxed into the regeneration tower 9 and the residue is supplied to the amine recovering unit 4 after being cooled by a cooling unit 13.

Examples of the present invention are illustrated as follows. However, the scope of the present invention is not limited to these examples.

EXAMPLE 1

500 $Nm^3$/hr of a combustion exhaust gas which contains 10% carbon dioxide was supplied to a carbon dioxide absorption unit in a carbon dioxide removal tower and was brought into contact with 30% by weight of a monoethanolamine aqueous solution at a vapor/liquid ratio of 2 at 60° C. Thus, carbon dioxide was absorbed into the solution. The exhaust gas (about 80° C.) after the absorption of carbon dioxide was brought into vapor-liquid contact with the washing water at 45° C. in an amine recovering unit (washed with washing water of 45° C.) to recover part of the amine into a water phase. An S exhaust gas from the carbon dioxide removal tower was passed through a demister, which was built of stainless wire mesh form having a glass wool layer of 200 mm in thickness and was installed at a horizontal part located on the downstream side of the carbon dioxide removal tower, at 45° C. In the demister, mist which contains the amine was collected and discharged into the atmosphere.

The carbon dioxide absorbing ratio in the carbon dioxide removal tower was about 90%. The concentration of the amine which is contained in the exhaust gas at the outlet of the carbon dioxide removal tower was 100 ppm, and the concentration of the exhaust gas at the outlet of the demister was 10 ppm and constant.

Comparative Example 1

The same procedure as that of Example 1 was repeated except that the water which was brought into vapor-liquid contact with the gas in the amine recovering unit had a temperature of 65° C. The concentration of the amine contained in the exhaust gas at the outlet of the carbon dioxide removal tower was 300 ppm, and the concentration of the amine contained in the exhaust gas at the outlet of the demister was 70 ppm. When the exhaust gas passed through the demister, the temperature of the exhaust gas was 65° C.

Table 1 shows the summarized results of Example 1 and Comparative Example 1. It can be seen from these results that by lowering the temperature in the amine recovering unit the amine collection ratio in the demister is increased and the concentration of the amine at the outlet of the demister significantly decreases.

What is claimed is:

1. A process for recovering a basic amine compound which comprises the steps of:
   (a) supplying a $CO_2$-containing gas to a carbon dioxide absorbing unit in which an absorbing solution which contains a basic amine compound absorbs carbon dioxide;
   (b) bringing the gas, from which carbon dioxide has been removed, into vapor-liquid contact with washing water at a temperature from 20 to 60° C. in an amine recovering unit of a carbon dioxide removal tower, recovering part of the basic amine compound accompanying the gas into a water phase and discharging the gas as an exhaust gas from the carbon dioxide removal tower and;
   (c) collecting the basic amine compound which remains in the exhaust gas of the carbon dioxide removal tower by passing the exhaust gas through an exteriorly located demister at a temperature from 20 to 60° C., wherein the temperature of the gas in the demister is lower than the temperature of the gas which enters the amine recovering unit, and wherein the demister is capable of being cooled and is in a wire mesh form having fine glass wool fibrous layers.

2. The process for recovering a basic amine compound as claimed in claim 1, wherein the temperature of the vapor-liquid contact ranges from 20 to 50° C.

3. A process for recovering a basic amine compound as claimed in claim 1, wherein the process is used for absorbing and discharging carbon dioxide from the $CO_2$-containing gas and the carbon dioxide removal tower includes said carbon dioxide absorbing unit in a lower portion thereof, and said amine recovering unit in an upper portion thereof, and wherein the demister is located on a downstream side of the carbon dioxide removal tower.

4. An apparatus for absorbing and treating carbon dioxide which comprises:
   a carbon dioxide removal tower which comprises a carbon dioxide absorption unit in a lower portion and an amine recovering unit in an upper portion, the carbon dioxide absorption unit being supplied with a $CO_2$-containing gas from a location exterior to said tower and said carbon dioxide absorption unit holding an absorbing solution of a basic amine compound, the amine recovering unit being capable of bringing gas which has passed through the carbon dioxide absorption unit into vapor-liquid contact with a washing water at a temperature from 20 to 60° C.; and
   a demister which is located on a downstream side of the carbon dioxide removal tower and through which the exhaust gas of the carbon dioxide removal tower can pass at a temperature from 20 to 60° C., wherein the temperature of the gas in the demister is lower than the temperature of the gas which enters the amine recov-

TABLE 1

|  | vapor-liquid contact temperature (° C.) | Concentration of amine at the outlet of an amine recovering unit (ppm) | Concentration of amine at the outlet of a demister (ppm) | Collection ratio of amine in a demister (%) |
| --- | --- | --- | --- | --- |
| Example 1 | 45 | 100 | 10 | 90 |
| Comparative Example 1 | 65 | 300 | 70 | 77 | ering unit, and wherein the demister is capable of being cooled and is in a wire mesh form having fine glass wool fibrous layers.

5. A process according to claim 1, wherein said basic amine compound is one or more compounds selected from the group consisting of monoethanolamine, diethanolamine, butylethanolamine, dimethylaminoethanol, methylpyrrolidone, 2-amino-2-methyl-1-propanol, and methylaminocarboxylic acid.

6. A process according to claim 1, wherein said basic amine compound is in the form of an aqueous solution.

7. A process according to claim 1, wherein said basic compound is mixed with at least one compound selected from the group consisting of methanol, polyethylene glycol, and sulfolane.

8. A process according to claim 1, wherein after being passed through the demister said basic amine compound in said exhaust gas is present in an amount less than 70 ppm.

9. A process according to claim 1, wherein said amine compound reacts with carbon dioxide to form a carbonate complex of said amine compound.

10. A process according to claim 1, wherein collected mist from the demister is regenerated to the carbon dioxide removal tower or to a regeneration tower after being dissolved in a solvent.

11. An apparatus according to claim 4, wherein said carbon dioxide removal tower is a packed tower or a plate tower.

12. An apparatus according to claim 4, wherein said demister is either a plate form, a wave form, a teardrop form or a wire mesh form.

13. An apparatus according to claim 4, further comprising a regeneration tower which accepts accumulated mist from said demister.

14. An apparatus according to claim 13, further comprising a heat exchanger which heats carbon dioxide from said absorbing solution and supplies the carbon dioxide to said regeneration tower.

15. A process according to claim 1, wherein said basic amine compound is one or more alkanolamine compounds.

* * * * *